3,197,356
LAMINATED PANEL
James K. Campbell, Midland, Mich., assignor to Dow Corning Corporation, Midland, Mich., a corporation of Michigan
No Drawing. Filed Sept. 27, 1962, Ser. No. 226,730
3 Claims. (Cl. 161—93)

This invention relates to a novel laminated structure in the form of a panel exhibiting excellent acoustical and thermal insulation properties, having a decorative, easily cleaned surface.

Laminated and pressed materials have been employed for many years as panels and/or tiles in a variety of structures. Recently the automobile industry has developed a unitary, shaped panel for use as a headliner in automobiles. The headliner is the material covering the interior of the metal roof on the automobile body. The requirements for such a laminated structure include the following factors. It must be somewhat flexible. It must be acoustic in that noises in the interior of the automobile are reduced by the headliner. It must not transmit heat readily thus it must have thermal insulation qualities. It must have a decorative surface easily variable to conform with the interior upholstery and trim in the automobile. In addition, the surface of the headliner should be easily cleanable.

It is apparent many of the requirements noted for automobile headliners are also pertinent to laminated building materials in general. However, the cleanability of the laminate surface is perhaps more critical in the case of the headliner than it would be in other applications. The headliners frequently become soiled during storage and installation. The dirt acumulation must be removed from the headliner before the automobile can be marketed.

It is an object of this invention to introduce a laminated material particularly useful in the construction of buildings and vehicles. A further object is a preformed panel useful in automobile interiors, building construction, and the like. A readily cleanable thermal insulation panel exhibiting a decorative surface is also an object. Other objects and advantages of this invention are detailed in or will be apparent from the disclosure and claims following.

The above objects are obtained with a laminate prepared by molding under heat and pressure a structure built up of at least one layer of fibrous mat material, the fibers of which are coated with a thermosetting organic resin, an intermediate layer of copolymeric resinous film consisting essentially of 90 to 99 mol percent of ethylene units, propylene units or a mixture thereof and 1 to 10 mol percent of units derived from an ethylenically unsaturated carboxylic acid susceptible of addition polymerization, and a layer of glass fabric coated with a silicone.

The base material employed in the laminates of this invention is a mat of fibers. The mat can be of any fibrous material such as asbestos, glass fibers, cotton fibers, synthetic fibers such as nylon, acrylic fibers, modacrylic fibers and polyester fibers, wool fibers, and other cellulosic fibers. The most preferred fiber is glass fiber which can be formed into mats by any desired means. The loose mat fibers are coated with any thermosetting resin material, preferably a phenolic resin.

The intermediate film is a resinous copolymer which is predominantly polyethylene. The copolymers can be described as modified polyethylenes or polypropylenes. The modifying agents are ethylenically unsaturated carboxylic acids susceptible of addition polymerization such as acrylic acid, methacrylic acid and vinylacetic acid. The copolymers are prepared by high pressure polymerization techniques well known in the art (see U.S. Patent No. 2,200,429). The preferred copolymer contains 1 to 10 mol percent of units derived from acrylic acid and 90 to 99 mol percent of ethylene units.

The decorative surface of the laminated panel consists of a glass fabric treated with silicone. The glass fibers can be pigmented, dyed or otherwise colored prior to or after weaving to form the glass fiber fabric. The pigmented or otherwise colored fibers are treated with a silicone prior to or after weaving to form the fabric.

The well known silicone water-repellents for use on fabrics can be employed herein. These silicone fluid copolymers contain one or more units of the formulae $RSiO_{3/2}$, $R_2SiO$, $R_3SiO_{1/2}$ and $SiO_{4/2}$ where R can be a monovalent hydrocarbon radical or a hydrogen atom. Such compositions are disclosed in United States Patents Nos. 2,588,365; 2,588,366; 2,728,692; 2,807,601; 2,838,423; 2,842,509; and 2,894,967. The preferred silicones for treatment of the glass fabric are mixtures of diorganosiloxane fluids, particularly dimethylsiloxane fluids and methylhydrogensiloxane fluid emulsified in water employing metal salts of carboxylic acids, particularly tin and zinc salts, as curing catalysts.

The laminate is prepared by laying up the fibrous mat and copolymeric resinous film in alternate layers, there being at least one layer of fibrous mat and a covering layer of copolymeric resinous film and a final layer of silicone treated glass cloth covering the resinous film. The structure is then placed in a press and molded at 200° to 600° F. for 15 seconds to 10 minutes, preferably 300° to 500° F. for 30 seconds to 5 minutes. The resulting laminate is easily removed from the mold. The laminate is a unitary structure having a decorative surface from which grease, water borne stain, finger prints and other forms of commonly encountered discoloration can be removed without danger of solvent ringing, crocking-off of pigment or other deleterious affect on said surface.

The following examples are included herein to aid those skilled in the art to gain an understanding and to practice this invention.

Example 1

A glass fiber mat approximately two inches thick having a phenolic resin coating on the fibers, an extruded resinous film prepared from a copolymer of 97 mol percent ethylene units and 3 mol percent of acrylic acid residues and a pigmented glass fabric coated with a mixture of 95 parts by weight hydroxyl endblocked dimethylsiloxane fluid and 5 parts by weight methylhydrogensiloxane fluid catalyzed with zinc-2-ethylhexoate and dibutyltin diacetate were laid up in the recited order. The glass cloth had been treated by dipping it in an aqueous emulsion of the siloxane mixture, air-dried and heated at 350° F. for 1.5 minutes to cure the siloxane. The treated fabric contained .6 percent by weight of the cured siloxane. The resulting sandwich structure was placed in a mold and pressed to about one-fourth inch thickness and heated under pressure at 400° F. for 3 minutes. The resulting laminate displayed excellent adhesion between the various layers and the silicone treated glass cloth surface could be soiled and cleaned without solvent ringing, crocking of pigment or other deleterious effect.

Example 2

Similar results were achieved and a good laminate was produced when the method of Example 1 was followed employing as the silicone on the glass fabric an aqueous emulsion of: (a) a methylhydrogensiloxane of about 50 cs. viscosity at 25° C.; (b) a mixture of 75 parts by weight hydroxyl endblocked dimethylsiloxane polymer of 3000 cs. at 25° C. and 25 parts by weight of the methylhydrogensiloxane described in (a); (c) a mixture of 75 parts by weight of a dimethylsiloxane polymer of 10,000 cs. at 25° C. and 25 parts by weight of the methylhydrogensiloxane described in (a); or (d) the mixture of Example 1 to which was added a fluid copolymer of $(CH_3)_3SiO$ units and $SiO_{4/2}$ units wherein the average methyl to silicon ratio was about 1.4/1.

*Example 3*

When the glass fiber mat of Example 1 was replaced by an asbestos fiber mat or a cellulosic fiber mat, equivalent results were achieved.

*Example 4*

Similar results were achieved following the method of Example 1 employing a copolymeric film consisting essentially of 95 mol percent ethylene units modified and copolymerized with 5 mol percent of methacrylic or vinylacetic acid.

That which is claimed is:

1. An acoustic, thermal insulating, decorative panel consisting of (1) a layer of a glass fiber mat having a phenolic resin coating on the fibers and being firmly adhered to (2) an extruded film of a copolymer consisting of 97 mol percent ethylene units and 3 mol percent of acrylic acid residues, which is in turn firmly adhered to (3) a pigmented glass fabric coated with a silicone consisting of 95 parts by weight of a dimethylsiloxane fluid and 5 parts by weight of a methylhydrogensiloxane fluid.

2. An acoustic, thermal insulating, decorative panel consisting essentially of (1) at least one layer of a fibrous mat having a coating of a thermosetting organic resin and being firmly adhered to (2) a film of a copolymer consisting of 90 to 99 mol percent of units selected from the group consisting of ethylene and propylene units and 1 to 10 mol percent residues derived from an ethylenically unsaturated carboxylic acid susceptible of addition polymerization, which is in turn firmly adhered to (3) a glass fabric coated with water-repellent mixtures of diorganosiloxane fluids containing units selected from the group consisting of $RSiO_{3/2}$, $R_2SiO$, $R_3SiO_{1/2}$ and $SiO_{4/2}$, where R is a monovalent radical selected from the group consisting of hydrocarbon radicals and hydrogen atoms.

3. An acoustic, thermal insulating, decorative panel consisting essentially of (1) at least one layer of a glass fiber mat having a coating of a thermosetting organic resin and being firmly adhered to (2) an extruded film of a copolymer consisting of 90 to 99 mol percent of ethylene units and 1 to 10 mol percent of residues of ethylenically unsaturated carboxylic acid selected from the group consisting of acrylic acid, methacrylic acid and vinylacetic acid, which is in turn firmly adhered to (3) a glass fabric coated with water-repellent mixtures of diorganosiloxane fluids consisting of dimethylsiloxane fluids and methylhydrogensiloxane fluids.

References Cited by the Examiner

UNITED STATES PATENTS

| | | |
|---|---|---|
| 2,200,429 | 5/40 | Perrin et al. |
| 2,355,608 | 8/44 | Stieger _____ 154—44.5 |
| 2,628,214 | 2/53 | Pinkney et al. _____ 260—86.7 XR |
| 2,649,396 | 8/53 | Witt et al. |
| 2,734,289 | 2/56 | Heaton et al. |
| 2,768,925 | 10/56 | Fay. |

ALEXANDER WYMAN, *Primary Examiner.*

MORRIS SUSSMAN, EARL M. BERGERT, *Examiners.*